United States Patent
Dasilva et al.

(10) Patent No.: US 8,082,235 B1
(45) Date of Patent: Dec. 20, 2011

(54) SELF HEALING SYSTEM FOR INACCURATE METADATA

(75) Inventors: Timothy Dasilva, North Hills, CA (US); Nicholas Austin White, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 12/421,445

(22) Filed: Apr. 9, 2009

(51) Int. Cl.
*G06F 17/30* (2006.01)
(52) U.S. Cl. .......................................... 707/691; 707/692
(58) Field of Classification Search ................ 707/690, 707/691, 692
See application file for complete search history.

(56) References Cited

U.S. PATENT DOCUMENTS

| | | | | |
|---|---|---|---|---|
| 6,658,393 | B1 * | 12/2003 | Basch et al. | 705/38 |
| 2008/0134043 | A1 * | 6/2008 | Georgis et al. | 715/733 |
| 2008/0235217 | A1 * | 9/2008 | Sharma et al. | 707/5 |
| 2008/0288479 | A1 * | 11/2008 | Paknad et al. | 707/4 |
| 2009/0037431 | A1 * | 2/2009 | Martino et al. | 707/10 |

* cited by examiner

*Primary Examiner* — Cheryl Lewis
*Assistant Examiner* — Nan Hutton
(74) *Attorney, Agent, or Firm* — Fenwick & West LLP

(57) ABSTRACT

Based on a probability of summary metadata associated with an entity of a media hosting service being inaccurate, a determination is made as to whether to verify the accuracy of the summary metadata. In response to determining to verify the accuracy of the summary metadata, a determination is made as to whether the summary metadata is inaccurate with respect to master metadata associated with the entity of the media hosting service. The summary metadata is updated with a correct value determined from the master metadata, in response to determining the summary metadata is inaccurate.

22 Claims, 5 Drawing Sheets

Summary Table
200

202

|  | Videos Watched | Videos Uploaded | Favorite Videos | Channel Views |
|---|---|---|---|---|
| User A | 150 | 114 | 1 | 130 |
| User B | 50 | 200 | 5 | 65 |
| User C | 100 | 5 | 1 | 160 |

Favorite Videos Master Table
212

| User A | Video # 518 | 206 |
|---|---|---|
| User B | Video # 13 | |
|  | Video # 55 | |
|  | Video # 79 | 208 |
|  | Video # 151 | |
|  | Video # 2 | |
| User C | Video # 153 | 210 |
|  | Video # 356 | |

FIG. 2b

SELF HEALING SYSTEM FOR INACCURATE METADATA

BACKGROUND OF THE INVENTION

1. Field of the Invention

This invention pertains in general to correcting metadata that has become inaccurate.

2. Description of the Related Art

Typically, computer systems constantly store and update metadata that is generated based on the operations of the system. A system may store metadata for multiple reasons, such as to allow the system to perform certain functions, to provide information to users interacting with the system, and to allow system administrators to determine the status of the system, determine usage characteristics of the system, or identify and correct problems in the system. For example, in a video hosting service that allows users to access videos that are available over the Internet, the service will generally maintain metadata about the usage of the service. Examples of such usage metadata include the number of times a video has been viewed, the number of comments a video has received, the number of videos a user has watched, and the number of favorite videos a user has.

When metadata is updated, the metadata may not be updated correctly due to software, hardware, or network problems, which results in the metadata no longer being accurate. For example, instead of being incremented, a count may erroneously be decremented or not changed at all. Since the metadata is constantly being used by a system, it is important that the metadata is accurate. However, when a system maintains a large amount of metadata it is difficult and inefficient to review all of the system's metadata to determine which metadata is inaccurate and needs to be corrected.

BRIEF SUMMARY OF THE INVENTION

The present invention provides methods, computer program products, and systems for correcting inaccurate metadata associated with an entity of a media hosting service. An embodiment of the method and computer program product comprises determining whether to verify the accuracy of summary metadata associated with an entity of a media hosting service, based at least in part on a probability of the summary metadata being inaccurate. In response to determining to verify the accuracy of the summary metadata, a determination is made as to whether the summary metadata is inaccurate with respect to master metadata associated with the entity of the media hosting service. The summary metadata is updated with a correct value determined from the master metadata in response to determining the summary metadata is inaccurate.

An embodiment of the system comprises a probability server computer configured to determine whether to verify the accuracy of summary metadata associated with an entity of a media hosting service, based at least in part on a probability of the summary metadata being inaccurate. The system further comprises a verification server computer configured to determine whether the summary metadata is inaccurate with respect to master metadata associated with the entity of the media hosting service, in response to determining to verify the accuracy of the summary metadata. The verification server computer is further configured to update the summary metadata with a correct value determined from the master metadata, in response to determining the summary metadata is inaccurate.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2a is an example of a summary table according to one embodiment.

FIG. 2b is an example of a master table according to one embodiment.

DETAILED DESCRIPTION

Figure 1:
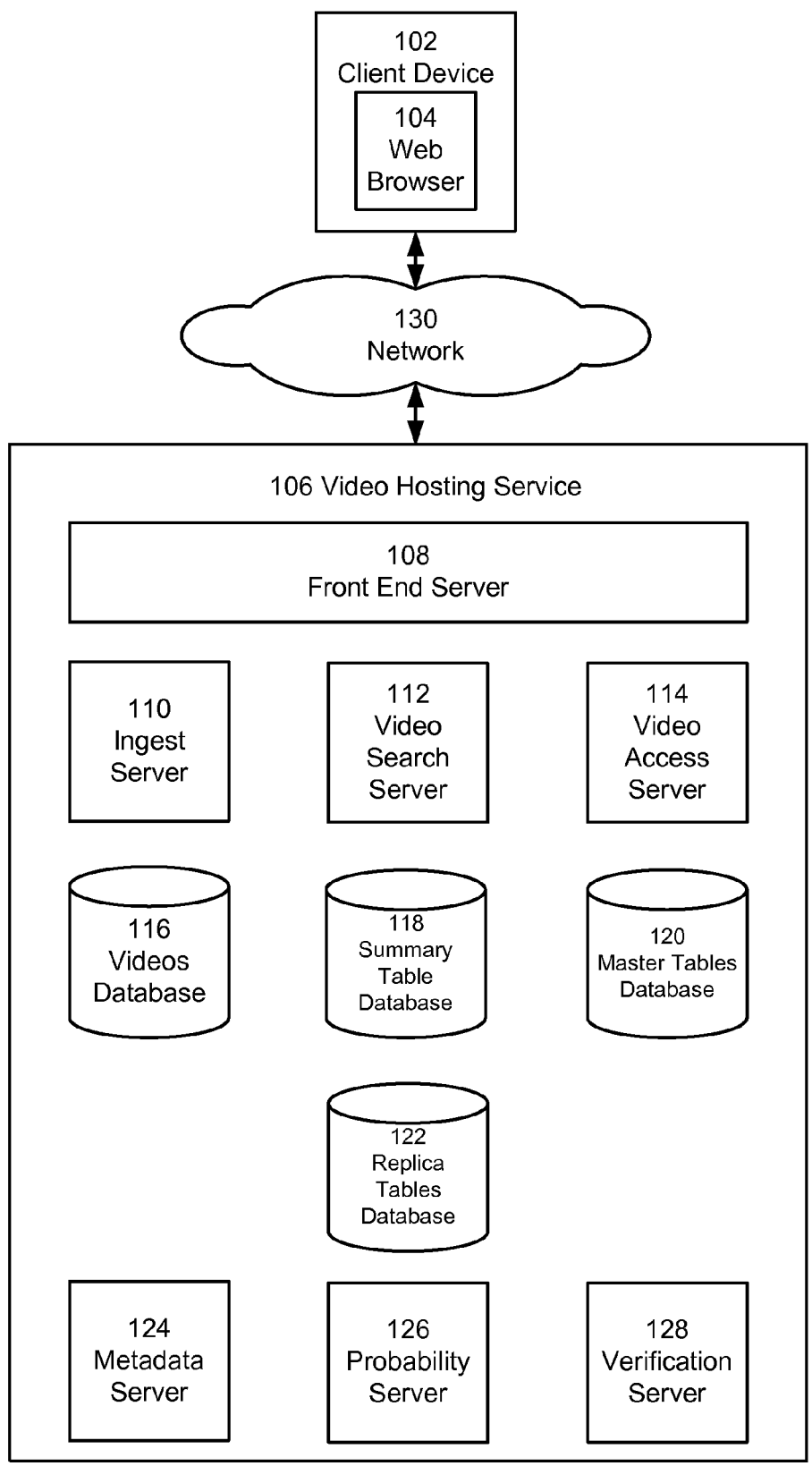
FIG. 1 is a high-level block diagram of the environment and system architecture of a video hosting service according to one embodiment.

FIG. 1 is a high-level block diagram of the environment 100 and system architecture of a video hosting service 106 according to one embodiment. FIG. 1 illustrates a client device 102 (or simply "client") and a video hosting service 106 connected by a network 130. The client device 102 is any computing device that allows a user to access videos included in the video hosting service 106. A user of the client device 102 can access a video from the video hosting service 106 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting service 106 is adapted to receive videos for storage in order to enable the sharing of the videos with other users.

The video hosting service 106 communicates with clients 102 over the network 130. In one embodiment, the video hosting service 106 is implemented at least in part using web-based technologies to support a website, in which case the client 102 is a personal computing device executing a web browser 104 such as GOOGLE CHROME, MICROSOFT INTERNET EXPLORER, or MOZILLA FIREFOX that allows the user to view webpages and videos provided by the video hosting service 106. In one embodiment, the web browser 104 includes a video player (e.g., Flash™ from Adobe Systems, Inc.). The client device 102 may be a network-capable device other than a computer system, such as a personal digital assistant (PDA), a cellular telephone, a pager, a television "set-top box" etc. Although FIG. 1 illustrates only a single client device 102, it should be understood that many (e.g., millions) clients 102 can communicate with the video hosting service 106 at any time. The single client 102 is illustrated in order to simplify and clarify the present description.

The network 130 represents the communication pathways between the client 102 and the video hosting service 106. In one embodiment, the network 130 is the Internet, but may also be any network, including but not limited to a LAN, a MAN, a WAN, a mobile, wired or wireless network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting service 106 represents any system that allows users of client 102 to access video content via searching and/or browsing interfaces. The sources of videos can be from uploads of videos by users, searches or crawls by the system of other websites or databases of videos, or the like, or any combination thereof. For example, in one embodiment, a video hosting service 106 can be configured to allow upload of content by users. In another embodiment, a video hosting service 106 can be configured to only obtain videos from other sources by crawling such sources or searching such sources, either offline to build a database of videos, or at query time.

To simplify and clarify the present description, the content received and shared by the video hosting service 106 will be referred to as videos, video files, or video items, but it should be understood that the video hosting service 106 can receive and share content of any media type and file type (e.g., audio, images). Therefore, the video hosting service 106 may also be referred to as a "media hosting service," and references to "videos" or variants thereof should be understand to include other types of media as well. A suitable video hosting service 106 for implementation of the system is the YOUTUBE™ website; other video hosting services are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting service 106 includes a front end server 108, an ingest server 110, a video search server 112, a video access server 114, a videos database 116, a summary table database 118, master tables 120, replica tables 122, a metadata server 124, a probability server 126, and a verification server 128. Many conventional features, such as firewalls, load balancers, application servers, failover servers, site management tools and so forth are not shown so as not to obscure the features of the system.

Each of the various servers is implemented as a server program executing on a server-class computer comprising a CPU, memory, network interface, peripheral interfaces, and other well known components. The computers themselves preferably run an operating system (e.g., LINUX), have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media). When configured to execute the various operations described herein, a general purpose computer becomes a particular computer, as understood by those of skill in the art, as the particular functions and data being stored by such a computer configure it in a manner different from its native capabilities as may be provided by its underlying operating system and hardware logic.

The front end server 108 handles communication with the client 102 via the network 130. The front end server 108 receives requests from users and communicates with the other servers of the video hosing service 106 to process the requests. For example, if a user requests to access a video, the front end server 108 makes sure that the proper servers process the request and that the video is transmitted to the client 102 of the user.

Additionally, the front end server 108 maintains account information for each user that has an account with the video hosting service 106. The account information is used to identify a user interacting with the video hosting service 106. In one embodiment, the account information maintained by the front end server 108 for each user includes a username, password, and/or other indentifying information. In response to the receipt of a request from a user to sign in, the front end server 108 presents the user with a webpage where the user can enter his or her username and password. If the user submits the correct username and password, the front end server 108 signs in the user to the video hosting service 106.

The ingest server 110 processes video files received by the front end server 108 from a user for posting to the video hosting service 106. In one embodiment, the processing of a video file received includes assigning a video identification (video ID) to the video file and storing the video file in a videos database 122. In one embodiment, the videos database 122 is a storage system that includes video files shared by the video hosting service 106 with users. Other steps that may be involved in processing the received video file before storing it in the videos database 122 include: formatting (e.g., transcoding), compressing, content analysis, and/or other data processing methods.

The video search server 112 processes any search queries received by the front end server 108 from users. A search query received by the front end server 108 from a user includes search criteria, such as keywords that may identify videos the user is interested in viewing. The video search server 112 uses the search criteria to query the videos database 122 for video files that are relevant to the search criteria. The search results from the query are transmitted to the front end server 108 for presentation to the user via the client 102. For example, if a user provides the front end server 108 with a keyword search query with the word "Ferrari" the video search server 112 identifies videos stored in the videos database 122 related to the word "Ferrari."

The video access server 114 processes requests from users ("viewers") to access certain videos via their clients 102. In one embodiment, the video access server 114 receives a request from a viewer's client 102 to access a video when the viewer clicks on a link to the video. The request received from the viewer includes the video ID of the video the viewer wishes to access for viewing (this can be included automatically once the viewer clicks on the link for the video). The video access server 114 uses the video ID to search and locate the video in the videos database 122. Once the requested video is located, the video access server 114 transmits the video to the viewer's client 102 with the help of the front end server 108. The video is presented to the viewer on a webpage.

The summary table database 118 includes a summary table that maintains summary metadata for each entity associated with the video hosting service 106. The entities associated with the video hosting service 106 are users, groups formed of one or more users, videos stored in the videos database 116, and any other media content shared by the video hosting service. It should be understood that what is meant by media content is content having spatial and/or temporal characteristics (e.g., audio, video, images), and which can be rendered into human-perceptible form. In one embodiment, the summary table database 118 includes multiple summary tables and summary metadata for each type of entity is maintained in a different summary table. For example, summary metadata of users is maintained in a first summary table and summary metadata of videos is maintained in a second summary table.

Summary metadata of an entity is a quantitative summary of events in the video hosting service 106 involving the entity. The quantitative summary can be any type of aggregated numerical values, such as sums, totals, averages, variances, rates, percentiles, or the like. For purposes of explanation then, the term "count" will be used without loss of generality to any of these types of aggregated values.

In one embodiment, summary metadata of an entity stored in the summary table 118 is comprised of various types of counts associated with the entity. Each count is an aggregated numerical value of occurrences of one or more specific events involving the entity's interactions with the video hosting service 106. The counts maintained in the summary table for a video stored in the videos database 116 include, for example, one or more of the following: number of times the video has been viewed by viewers, number of times that a specific percentage of the video was watched by viewers, number of ratings given to the video, average rating given to the video by the viewers, number of times the video has been added as a favorite by viewers, number of times the video has been shared on webpages or with viewers, number of comments the video has received from viewers, number of positive comments the video has received, number of neutral comments the video has received, and number of negative comments the video has received. Other counts pertaining to a video may also be maintained. Counts may be of all events of a given type, or constrained by other factors, such as time of day, day of week, geographic location of the viewer related to the event, internet domain, and so forth.

The counts maintained in the summary table for a user entity include, for example, one or more of the following: number of videos watched by the user, number of videos uploaded by the user, number of favorite videos selected by the user, number of channel views by the user, number of times other users have viewed the user's channel, number of subscribers to the user's videos, number of personal messages received by the user, number of user's unread personal messages, number of videos shared with the user, number of comments made by the user, number of friend invites received by the user, number of friends of the user, number of video responses posted by the user, number of messages sent by the user, number of times the user has signed in to the video hosting service, and the rating of the user. In one embodiment, metadata for a user is stored in anonymous form and associated with a user ID for a particular user.

FIG. 2a is an example of the summary table 200 in database 118 according to one embodiment. The summary table 200 includes columns 202, each column representing a count maintained for users of the video hosting service 106. The summary table database 118 additionally includes rows 204, each row includes counts associated with a specific user. For example, user C has watched 100 videos, uploaded 5 videos, has 1 favorite video, and has viewed 160 channels.

Master tables database 120 includes master tables that maintain master metadata for entities associated with the video hosting service 106. Master metadata of an entity is detailed information that describes events in the video hosting service 106 involving the entity (e.g., the list of videos user A has uploaded, the list of videos user A has added as favorites, etc.). As described above, summary metadata of an entity is a numerical summary of those events in the video hosting service 106 involving the entity (e.g., the number of favorite videos user A has). Therefore, the accuracy of summary metadata can be verified using the master metadata. In one embodiment, each master table has master data that can be used to verify the accuracy of a specific type of count in the summary table.

FIG. 2b is an example of a master table 212 according to one embodiment. The master table 212 includes master metadata that can be used to verify the accuracy of the favorite video counts in the summary table 200. For each user, the master table 212 includes the identifiers of videos that are the user's favorites. Although not shown, the master table may include more detailed metadata, such as the time and date when each video was made a favorite.

In this example of a master table 212, user A has one favorite video 206 and user B has five favorite videos 208. The number of items in these lists, 1 and 5 items respectively, correspond to the favorite video counts of the two users in FIG. 2a. However, user C has two favorite videos 210 in the master table 212, which does not correspond to the count in FIG. 2a of one favorite video, which indicates that the count in the summary table 200 is not accurate. As is described below, an inaccurate count in the summary table is updated based on master metadata. In this example, the inaccurate favorite videos count of user C would be changed from "1" to "2" in the summary table of FIG. 2a.

The replica tables database 122 includes replica tables that are copies of the master tables. The replica tables database 122 includes at least one replica table for each master table. A replica table includes the same metadata as its corresponding master table. In one embodiment, the replica tables lag behind their corresponding master table. This means that for a replica table having a lag, the metadata in the replica table is the metadata that was in the corresponding master table at a previous time. The lag of a replica table is the time difference between the current time and the time at which the master table had the same metadata that the replica table currently has. For example, assume a replica table has a 15 minute lag from its corresponding master table. At time T+15 minutes, the replica table has the same metadata as the corresponding master table at time T.

The metadata server 124 manages the summary table and the master tables. The metadata server 124 monitors communications between users and the video hosting service 106 for certain events that require that one or more counts in the summary table be updated. In response to detecting such an event, the metadata server 124 accesses a master table associated with the event and adds metadata that describes the event to the master table. In addition, the metadata server 124 updates the appropriate count in the summary table based on the detected event.

For example, with reference to FIGS. 2A and 2B, if the front end server 108 receives a request from user A to add video #345 as a favorite video, the metadata server 124 would accesses the favorite videos master table 212, and add a row for user A with video #345. The master metadata in the favorite videos master table would now reflect that the user A has two favorite videos and would indicate which videos these are. In addition, the metadata server 124 would also increment the favorite videos count of user A in the summary table database 118 by one to the value of "2".

In one embodiment, the metadata server 124 transmits select metadata from the summary table and/or the master tables for presentation to a user. In one embodiment, metadata from the summary table database 118 and/or the master tables is transmitted to a user's client device 102 by the metadata server 124, in response to the user requesting the metadata. For example, if a user requests to view a summary of his or her account, one or more counts in the summary table associated with the user (e.g., number of videos watched, number of favorite videos) are retrieved by the metadata server 124 and transmitted to the user for presentation.

In one embodiment, metadata from the summary table and/or the master tables is retrieved and transmitted by the metadata server 124 to a user without the user directly requesting the metadata. For example, if the front end server 108 receives a request from a user to access a specific video, one or more counts in the summary table associated with the video (e.g., number of time the video has been viewed, number of times the video has been added as a favorite) are retrieved and transmitted by the metadata server 124 with the requested video to the user. The retrieved counts are presented to the user on the same webpage as the video requested.

The probability server 126 identifies summary metadata in the summary table for which the accuracy should be verified. To determine which summary metadata to verify the accuracy of, the probability server 126 identifies an entity associated with the video hosting service 106. In one embodiment, an entity is identified by the probability server 126 monitoring for specific events and detecting an event associated with an entity. For example, for a user entity, a user may be identified when the probability server 126 receives an indication that the user has signed in to the video hosting service 106, or receives an indication that the front end server 108 received a request from the user to access a video stored in the videos database 116, or receives an indication that the user specifically requested that the accuracy of the summary data associated with the user be verified. As another example, for a video entity, a video may be identified when the probability server 126 receives an indication that the front end server 108 has received a request from a user to access the video. In another embodiment, the entity is identified by the probability server 126 processing each of the entities in the summary table.

The probability server 126 identifies counts in the summary table associated with the identified entity. In one embodiment, the probability server 126 calculates a probability $P_{count}$ for each count in the summary table associated with the identified entity based on the entities activity level in the video hosting service 106. The probability $P_{count}$ calculated for each count by the probability server 126, represents the likelihood that the count is inaccurate; alternatively $P_{count}$ can be the probability that the count is accurate.

The more active the identified entity is in the video hosting service 106, the higher the probability calculated by the probability server 126 will be. The reason is that the more active an entity is, the more opportunities there are for a count in the summary table to become inaccurate. For example, if a user A frequently adds or removes videos as favorites, the probability calculated for user A will be relatively high because user A's favorite videos count is frequently changing.

In one embodiment, the probability server 126 calculates the probability of a count associated with the identified entity being inaccurate by multiplying together the value of the count and a probability factor. In one embodiment, the probability factor is a number used to convert the count into a probability. The equation for calculating the probability is as follows:

$$P_{count} = C * P_{factor}$$

C represents the count, $P_{factor}$ represents the probability factor, and $P_{count}$ represents the probability calculated for the count. For example, assume the value of the count is 40 and the probability factor is 1%, the probability calculated by the probability server 126 for the count would be 40%. (0.40). In one embodiment, the probability factor used by the probability server 126 for each type of count is set by a system administrator; the factor can be determined based upon statistical review of historical access data.

In one embodiment, in addition to the count being multiplied by the probability factor, the probability server 126 also multiplies the count by one or more scale factors. The scale factors are used to either increase or decrease the probability based on characteristics of the entity with which the count is associated. For example, assume the count is associated with a video. A scale factor can be used to increase the probability for the count if the video is labeled as a featured or promoted video in the video hosting service. As another example, assume the count is associated with a user, a scale factor can be used to increase the probability for the count if the user has a high standing in the video hosting service 106, such as partner.

In one embodiment, the scale factors used to calculate the probability of a first count are the one or more of the other (second) counts associated with the entity. For example, assume the probability being calculated is for the favorite videos count of user A, other counts that may be used as scaling factors are the number of videos watched by user A and the number of videos posted by user A on the video hosting service 106. Where a second count associated with an entity is used as a scaling factor for a first count, the second count can be adjusted, for example by taking the log or root value thereof.

By using one or more of the other counts as scale factors, the probability is scaled based on the activity level of the entity associated with the count in the video hosting service 106. In one embodiment, the other counts used as scaling factors by the probability server 126 to calculate the probability of a count are specified by a system administrator.

In another embodiment, the probability server 126 calculates a probability for a count associated with the identified entity based on the same type of counts of other entities associated with the video hosting service 106. To calculate a probability for a count, the probability server 126 sums the same type of counts of other entities associated with the video hosting service 106. For example, assume the probability is being calculated for the videos watched count, the probability server 126 sums the videos watched counts in the summary table database 118 of all users. The probability server 126 divides the count for which the probability is being calculated by the value summed. Additionally, the probability may multiply the resulting value by at least one scaling factor greater than 1.0. The scaling factor may be as the ones described above or it may be a number set by a system administrator. The equation for calculating the probability of the count in this embodiment may be as follows:

$$P_{count} = (C / \Sigma C_{others}) * S_{factor}$$

"C" represents the count, "$\Sigma C_{others}$" represents the summation of the same type of counts of other entities associated with the video hosting service 106, "$S_{factor}$" represents a scaling factor, and "$P_{count}$" represents the probability calculated for the count.

Once the probability has been calculated for a count, the probability server 126 compares the calculated probability $P_{count}$ to a set threshold. If $P_{count}$ is above the set threshold, the probability server 126 generates a query for verifying the accuracy of the count. In one embodiment, each type of count has its own set threshold to which it is compared. A benefit of calculating a probability for each count associated with the identified entity and comparing each probability to its respective threshold is that the resources of the video hosting service 106 are concentrated on verifying counts of the entity that have a higher possibility of being inaccurate.

In one embodiment, instead of the probability server 126 calculating a probability for each count in the summary table associated with the identified entity, the probability server 126 calculates a probability $P_{entity}$ for the identified entity based on the entity's activity level in the video hosting service 106. The probability $P_{entity}$ represents the likelihood that the counts associated with the entity are inaccurate. In general, the more active the entity is in the video hosting service 106, the higher the probability calculated by the probability server 126 will be.

The probability server 126 uses one or more counts in the summary table database 118 associated with the identified entity as factors in calculating the probability. In one embodiment, only specific counts associated with the identified entity are used by the probability server 126 as factors. For example, assume the summary table maintains 10 counts for each user. To calculate the probability $P_{entity}$ for any user, the probability server 126 will only use the videos watched count, the videos uploaded count, and the favorite videos count of a user. In another embodiment, all of the counts associated with the identified entity are used as factors. In one embodiment, to use a count associated with the identified entity as a factor, the probability server 126 multiplies the count by a scaling factor.

The probability server 126 compares the calculated probability $P_{entity}$ to a set threshold. If the calculated probability is above the threshold, the probability server 126 generates a query for each count associated with the identified entity whose accuracy is to be verified. In one embodiment, all counts associated with the identified entity are selected to be to be verified. In one embodiment, only counts which have been indicated by a system administrator to be important or more likely to be inaccurate are selected to be verified. A benefit of calculating a probability for the identified entity and comparing the probability to a threshold is that the resources of the video hosting service 106 are concentrated on verifying the accuracy of counts associated with entities that have a higher possibility of having inaccurate counts.

In one embodiment, when the probability server 126 generates a query for verifying the accuracy of a count, the probability server 126 transmits the query directly to the verification server 128 for processing. In another embodiment, when the probability server 126 generates a query, the probability server 126 places the query in a queue. At some point the verification server 128 pulls the query from the queue and processes it. In one embodiment, the verification server 128 batches queries in the queue and only processes queries in the queue during specific times of day. Times when the video hosting service 106 processes queries in the queue may be when the number of users interacting with the video hosting service 106 is low (e.g., late at night).

In one embodiment the queue is a FIFO (First In, First Out) queue. In one embodiment, the location in which the probability server 126 places a query in the queue is based on the probability calculated that resulted in the query being generated. In one embodiment, even if a calculated probability is below a threshold, the probability server 126 still generates a query for a count associated with the probability to be verified. The location in which the probability server 126 places the query in the queue is based on the calculated probability.

The verification server 128 processes queries generated by the probability server 126 to verify the accuracy of counts in the summary table. A query generated by the probability server 126 indicates a replica table that the verification server 128 is to access, the type of count that is to be verified, and the entity with which the count is associated. The reason the query indicates that the verification server 128 access a replica table instead of its corresponding master table is to prevent the video hosting service 106 from slowing down by having too many servers accessing the master tables.

The verification server 128 identifies a query generated by the probability server 126 for processing. In the embodiment in which the verification server 128 receives queries directly from the probability server 126, the verification server 128 identifies the query for processing by receiving it from the probability server 126. In the embodiment in which queries generated by the probability server 126 are placed in a queue, the verification server 128 identifies the query for processing by pulling it from the queue.

If the replica tables 122 do not lag behind the master tables 120, the verification server 128 processes the identified query by accessing the replica table indicated by the query and using the query to identify specific metadata in the replica table. The verification server 128 determines the correct value of the count for which the query was generated based on the metadata identified. What is referred to as the correct value is what the value of the count should currently be in the summary table database 118. In one embodiment, the verification server 128 accesses master tables instead of replica tables. In one embodiment, the verification server 128 accesses more than one replica table to determine the correct value of the count.

On the other hand, if the replica tables lag behind their corresponding master tables, when the probability server 126 determines that the accuracy of a count should be verified and generates a query for verifying the count, the metadata server 124 begins to maintain a live count for the generated query. The live count allows the verification server 128 to determine what the current value of the count should be in the summary table database 118 despite the lag of the replica tables 122.

When the metadata server 124 starts a live count for a query, from that moment on, the metadata server 124 monitors the communications occurring between users and the video hosting service 106 for specific events that require the count indicated by the query to be updated. If an event monitored for is detected, the metadata server 124 increments or decrements the live count accordingly.

The verification server 128 delays processing a generated query until the amount of time that has passed since the metadata server 124 started maintaining the live count for the query is at least equal to or greater than the lag time of the replica table identified by the query. Therefore, in the embodiment in which the verification server 128 uses a queue to process queries, the verification server 128 pulls a query from the queue for processing at some point after the proper amount of time has passed since the metadata server 124 started maintaining a live count for the query.

In one embodiment, if the metadata server 124 receives a request for the count to be presented to a user prior to the verification server 128 processing the query to verify the count, the metadata server 124 sums the value of the live count and the current value of the count in the summary table. The summed value is presented to the user. Prior to the verification server 128 processing the query, the summed value is the best estimate that can be obtained of what the value of the count should be.

The verification server 128 processes the query after the delay by accessing the replica table indicated by the query and using the query to indentify specific metadata in the replica table. In one embodiment, the verification server 128 additionally uses the time at which the live count was started to identify the specific metadata. Based on the identified metadata, the verification server 128 determines what the value of the count should have been have been at the exact time when the metadata server 124 started maintaining the live count for the query. The verification server 128 sums the value of the count determined and the value of the live count being maintained by the metadata server 124. The value that results from the summation is the correct value of the count, which is the value that should currently be in the summary table database 118 for the count.

Therefore, one reason for delaying the processing of a generated query is so that the appropriate metadata is in the replica table to allow the verification server 128 to determine the value of the count at the exact time when the metadata server 124 started maintaining the live count. For example, assume a query is generated to verify the accuracy of the favorite videos count for user A. Additionally, assume that the replica table to be accessed to verify the count lags behind its respective master table by 15 minutes. The metadata server 124 starts maintaining a live count for the query at time T. From that moment on, the metadata server 124 increments the live count any time the front end server 108 receives from user A, a request for a video to be added as a favorite. Additionally, the metadata server 124 decrements the live count any time a request is received from user A for a video to be removed as a favorite.

At time T, the metadata in the replica table is representative of the metadata in the corresponding master table at T−15 minutes. The verification server 128 delays processing the query for 15 minutes. After 15 minutes (T+15 minutes), the verification server 128 processes the query by accessing the replica table. At that point in time the metadata in the replica table is representative of the metadata in the corresponding master table at T. The verification server 128 uses the query to identify specific metadata in the queue and determines what the value of the favorite videos count should have been at T (when the live count started) based on the identified metadata. The verification server 128 sums the value determined and the value of the live count (value of the favorite videos count from T to the current moment). The value that results from the summation is the correct value of the count, which is the value that should currently be in the summary table database 118 for the count.

Once the verification server 128 has determined correct value of the count, the verification server 128 identifies the count in the summary table. The verification server 128 compares the value of the count in the summary table database 118 to correct value determined. If the values compared are different, it signifies that the count in the summary table database 118 is not accurate. In response, the verification server 128 replaces the value in the summary table database 118 with the correct value.

Figure 3:
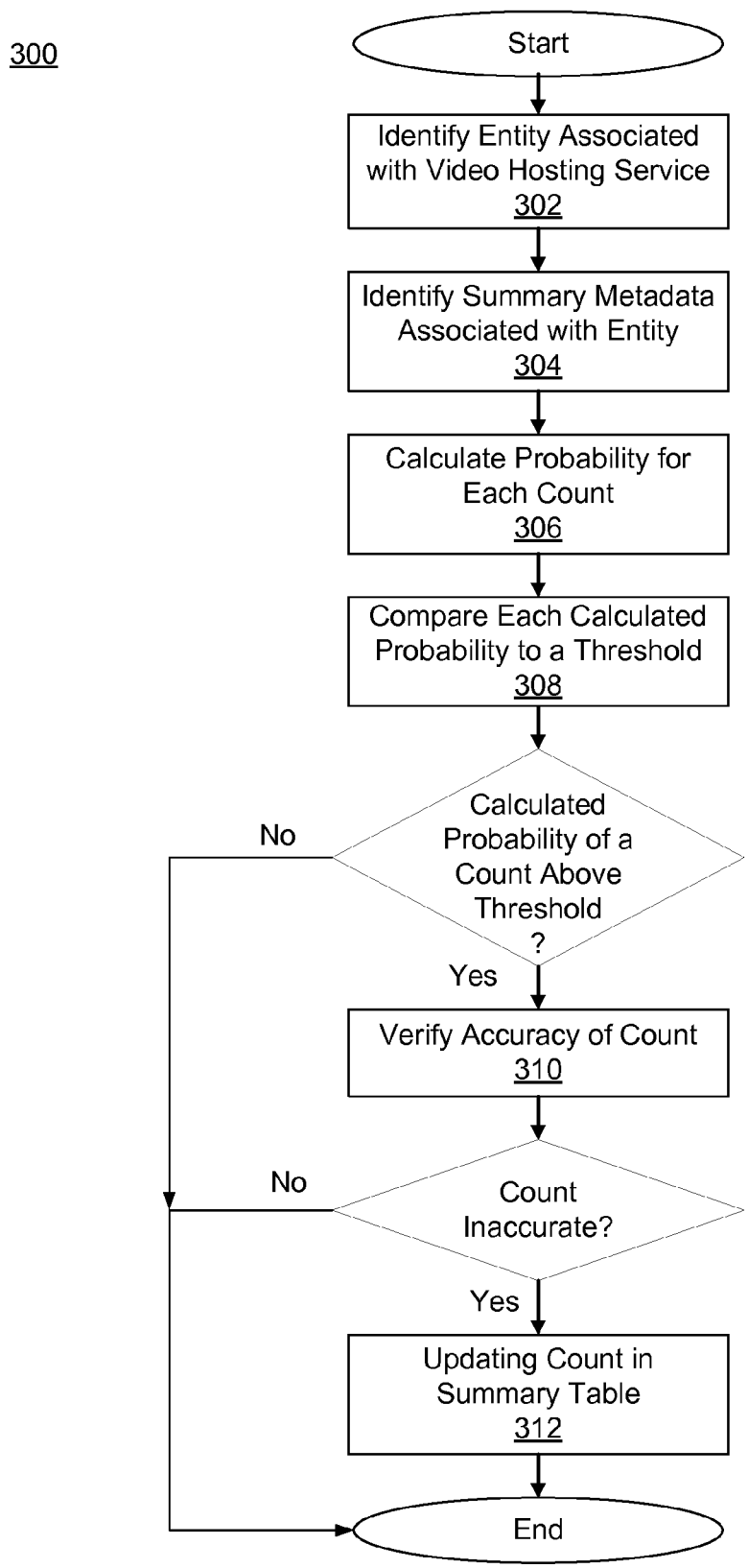
FIG. 3 is a flow chart illustrating the programmed operations of the video hosting service in updating inaccurate summary metadata according to one embodiment.

FIG. 3 is a flow chart 300 illustrating the programmed operations of the video hosting service 106 in updating inaccurate summary metadata according to one embodiment. Those of skill in the art will recognize that other embodiments can perform the steps of FIG. 3 in different orders. Moreover, other embodiments can include different and/or additional steps than the ones described here.

The video hosting service 106 identifies 302 an entity associated with the service 106. The entity may be for example, a user, a video contained in the video hosting service 106, or a group consisting of one or more users. The video hosting service 106 identifies 304 summary metadata in the summary table database 118 associated with the entity. The summary metadata identified by the service 106 is comprised of one or more counts.

The video hosting service 106 calculates 306 a probability for each count identified based on the entity's activity level in the video hosting service 106. The probability represents the likelihood that the count is inaccurate. For each calculated probability, the video hosting service 106 compares 308 the probability of the count to the threshold set for the count. If a calculated probability of a count is above a set threshold, the video hosting service 106 verifies 310 the accuracy of the count in the summary table by accessing a replica table. If it is determined that the count in the summary table is not accurate, the video hosting service 106 updates 312 the count in the summary table with the correct value.

It should be understood that while the video hosting service 106 updates inaccurate summary metadata associated with an entity, the other functions of the video hosting service 106 remain operative. For example, if summary metadata is being updated for a user, the user can still access videos stored in the videos database 116.

Figure 4:
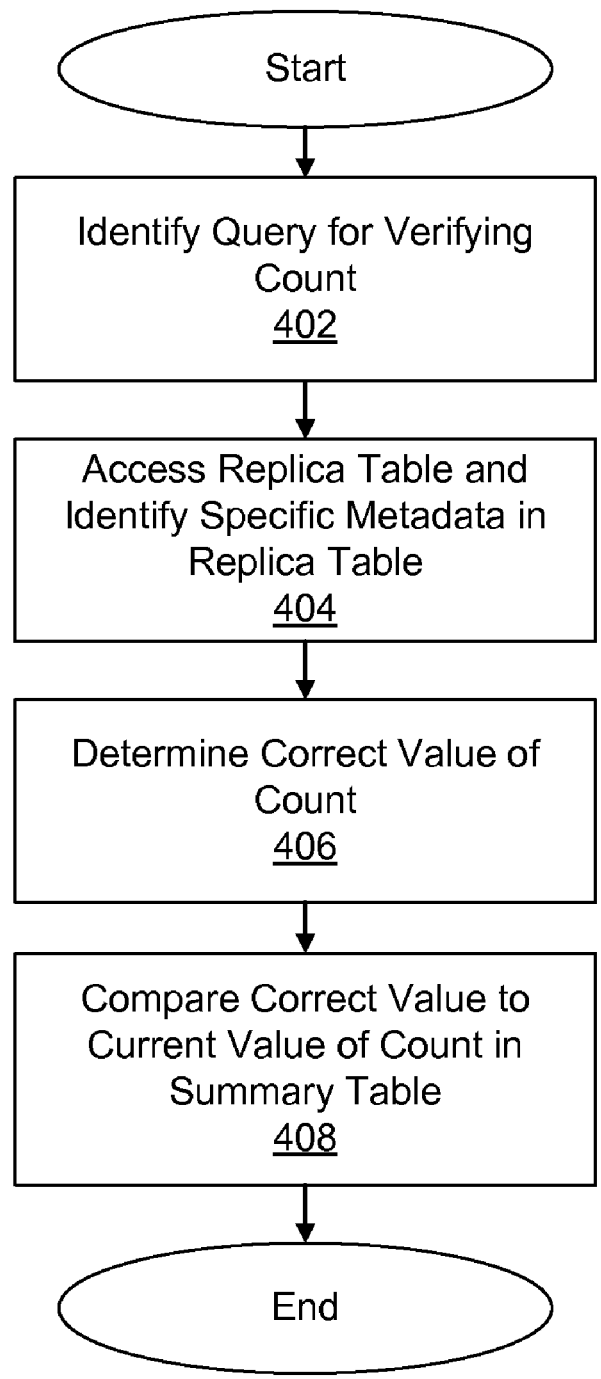
FIG. 4 is a flow chart illustrating the operations of the video hosting service in verifying the accuracy of a count, where the replica tables do not lag behind their respective master tables according to one embodiment.

FIG. 4 is a flow chart 400 illustrating one implementation of the step of verifying the accuracy of a count, where the replica tables do not lag behind their respective master tables, as in step 310 of FIG. 3. Those of skill in the art will recognize that other embodiments can perform the steps of FIG. 4 in different orders. Moreover, other embodiments can include different and/or additional steps than the ones described here.

Assume for purposes of this example that the video hosting service 106 has determined to verify the accuracy of a count in the summary table, and in response has generated a query for verifying the count. The query indicates a replica table to be accessed, the type of the count to be verified, and the entity with which the count is associated.

The video hosting service 106 identifies 402 the query for verifying the count. In one embodiment, the video hosting service 106 identifies the query by pulling it from a queue containing multiple queries. The video hosting service 106 processes the query by accessing 404 the replica table indicated by the query. The video hosting service 106 uses the query to identify specific metadata in the replica table. Based on the identified metadata, the video hosting service 106 determines 404 the correct value of the count, which is the value that should currently be in the summary table for the count. The video hosting service 106 compares the determined correct value to the current value of the count in the summary table to determine whether the count in the summary table database 118 is inaccurate. If the values are different, it signifies that the count in the summary table is inaccurate.

Figure 5:
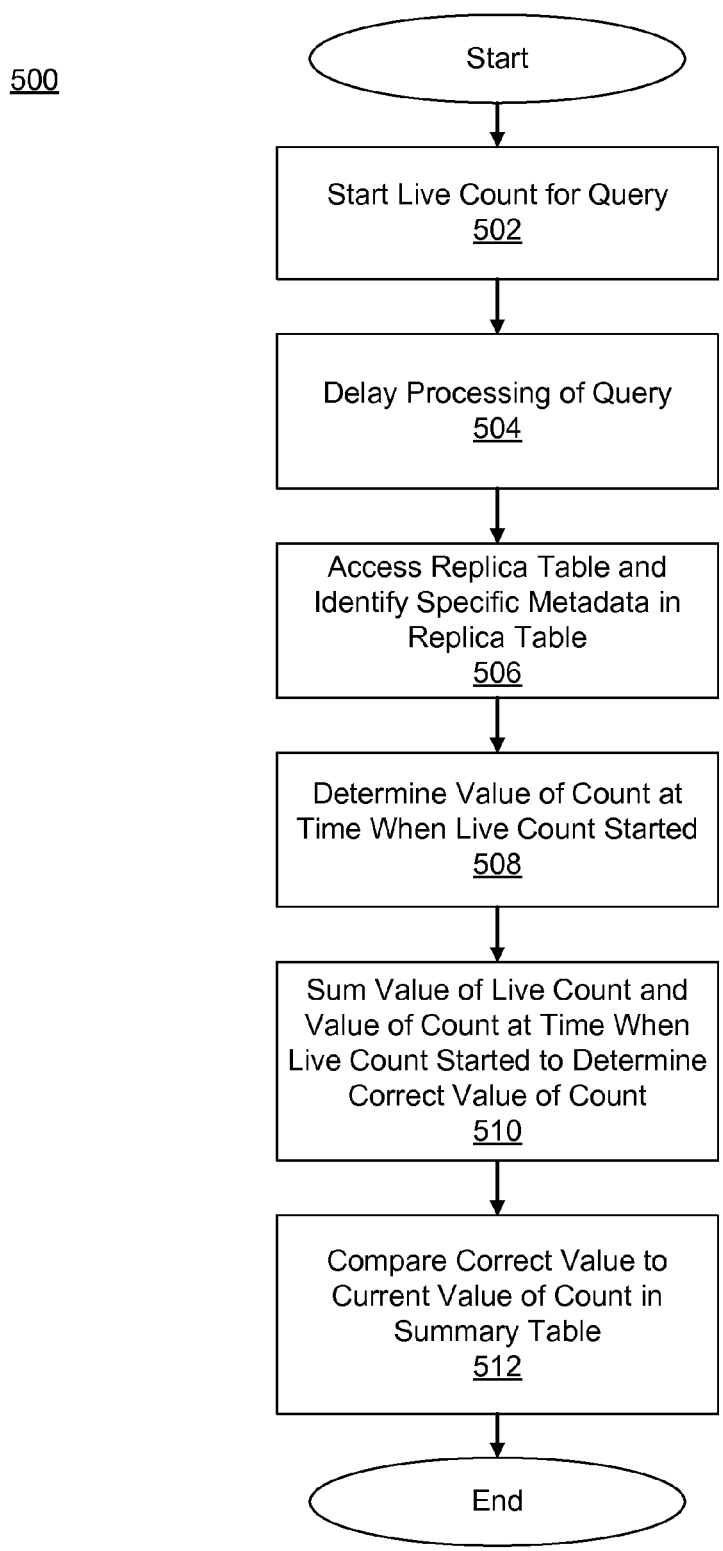
FIG. 5 is a flow chart illustrating the operations of the video hosting service in verifying the accuracy of a count, where the replica tables lag behind their respective master tables according to one embodiment The figures depict various embodiment of the present invention for purposes of illustration only. One skilled in the art will readily recognize from the following discussion that alternative embodiments of the structures and methods illustrated herein may be employed without departing from the principles of the invention described herein.

FIG. 5 is a flow chart 500 illustrating one implementation of the step of verifying the accuracy of a count, where the replica tables lag behind their respective master tables, as in step 310 of FIG. 3. Those of skill in the art will recognize that other embodiments can perform the steps of FIG. 5 in different orders. Moreover, other embodiments can include different and/or additional steps than the ones described here.

Assume for purposes of this example that the video hosting service 106 has determined to verify the accuracy of a count in the summary table, and in response has generated a query for verifying the count. The query indicates a replica table to be accessed, the type of the count to be verified, and the entity with which the count is associated. Additionally, assume that the replica table to be accessed lags behind its corresponding master table.

When the query is generated, the video hosting service 106 starts a live count for the query. From that moment on, the video hosting service 106 increments or decrements the count when an event is detected that requires the count indicated by the query to be updated. The video hosting service 106 delays 504 the processing of the query, until the amount of time that has passed since the live count was started is at least equal to or greater than the lag time of the replica table.

After the appropriate delay the video hosting service 106 processes the query. In one embodiment, the video hosting service 106 identifies the query for processing by pulling the query from a queue containing multiple queries. During the processing of the query, the video hosting service 106 continues to update the live count. The video hosting service 106 processes the query by accessing 506 the replica table indicated by the query. The video hosting service uses the query to identify specific metadata in the replica table. In one embodiment, the video hosting service 106 additionally uses the start time of the live count to identify the metadata. The video hosting service 106 determines 508 based on the identified metadata, the value of the count when the live count was started. The video hosting service 106 sums 510 the value of the live count and the value of the count when the live count was started to determine the correct value of the count. The correct value is the value that should currently be in the summary table database 118 for the count. The video hosting service 106 compares 512 the determined correct value to the current value of the count in the summary table to determine whether the count in the summary table database 118 is inaccurate. If the values are different it signifies that the count in the summary table is not accurate.

The metadata described herein has been described as summary metadata and master metadata, where the summary metadata can be verified using the master metadata. More generally, the summary metadata is first metadata associated with an entity, and the master metadata is second metadata associated with the entity, where the first metadata can be verified using a second metadata.

The operations described herein for verifying the accuracy of metadata and updating inaccurate metadata have been described as being performed in a video hosting service, it should be understood that operations may be performed in any system that stores metadata pertaining to real world entities. Systems in which the operations may be performed include for example, email systems (with entities such as users, e-mail messages), electronic purchasing systems (with entities such as users, e.g., sellers and purchasers, items or services being offered for sale, and orders by users), and social network systems (with entities such as users, groups, applications, messages).

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method, executed by a computer system, for correcting inaccurate summary metadata associated with an entity of a media hosting service, the method comprising:
    storing master metadata that describes events involving an entity in a media hosting service;
    storing summary metadata that summarizes the master metadata;
    calculating a probability of the summary metadata being inaccurate;
    determining whether to verify the accuracy of the summary metadata based at least in part on the calculated probability;
    responsive to determining to verify the accuracy of the summary metadata, determining whether the summary metadata is inaccurate with respect to the master metadata; and
    responsive to determining that the summary metadata is inaccurate, updating the summary metadata based at least in part on the master metadata.

2. The method of claim 1, wherein the probability is based on an activity level of the entity in a system.

3. The method of claim 1, wherein the probability is based one or more characteristics of the entity.

4. The method of claim 1, wherein the entity is a user of the media hosting service.

5. The method of claim 1, wherein the entity is a video accessible to a plurality of users of the media hosting service.

6. The method of claim 1, wherein the summary metadata is a count that is updated based at least in part on the detection of at least one event associated with the entity and wherein the master metadata describes the event.

7. The method of claim 6, wherein the probability is based on a value of the count.

8. The method of claim 6, wherein the probability is based on one or more other counts associated with the entity.

9. The method of claim 6, wherein probability is based on a value of the count and the same type of counts of one or more other entities.

10. The method of claim 1, wherein determining whether to verify the accuracy of the summary metadata comprises:
    determining to verify the accuracy of the summary metadata, responsive to the probability being above a threshold.

11. The method of claim 1, wherein determining whether the summary metadata is inaccurate comprises:
    determining a correct value of the summary metadata from the master metadata; and
    responsive to the correct value being different than a current value of the summary metadata, determining that the summary metadata is inaccurate.

12. The method of claim 1, wherein determining whether the summary metadata is inaccurate comprises:
    responsive to determining to verify the accuracy of the summary metadata, starting a live count, the live count updated responsive to detecting at least one event with which the summary metadata is associated;
    delaying processing of the master metadata by at least a lag time associated with a table storing the master metadata;
    determining from the master metadata a value of the summary metadata at the time when the live count was started;
    determining a correct value of the summary metadata based at least in part on a value of the live count and the determined value of the summary metadata at the time when the live count was started; and
    responsive to the correct value being different than a current value of the summary metadata, determining that the summary metadata is inaccurate.

13. The method of claim 1, further comprising:
    responsive to determining to verify the accuracy of the summary metadata, generating a query for a table in a database comprising the master metadata;
    placing the query in a queue; and
    pulling the query from the queue to determine whether the summary metadata is inaccurate.

14. The method of claim 13, wherein the query identifies the table, a type of the summary metadata, and the entity associated with the summary metadata.

15. The method of claim 13, wherein the location in which the query is placed in the queue is selected based at least in part on the calculated probability.

16. A computer program product comprising a non-transitory computer readable storage medium having computer program instructions and data embodied thereon for correcting inaccurate summary metadata associated with an entity of a media hosting service, the computer program instructions and data to configure a processor to perform the operations comprising:
    storing master metadata that describes events involving an entity in a media hosting service;
    storing summary metadata that summarizes the master metadata;
    calculating a probability of the summary metadata being inaccurate;
    determining whether to verify the accuracy of the summary metadata based at least in part on the calculated probability;
    responsive to determining to verify the accuracy of the summary metadata, determining whether the summary metadata is inaccurate with respect to the master metadata; and
    responsive to determining that the summary metadata is inaccurate, updating the summary metadata based at least in part on the master metadata.

17. The computer program product of claim 16, wherein determining whether the summary metadata is inaccurate comprises:
    determining a correct value of the summary metadata from the master metadata; and
    responsive to the correct value being different than a current value of the summary metadata, determining that the summary metadata is inaccurate.

18. The computer program product of claim 16, wherein determining whether the summary metadata is inaccurate comprises:
- responsive to determining to verify the accuracy of the summary metadata, starting a live count, the live count updated responsive to detecting at least one event with which the summary metadata is associated;
- delaying processing of the master metadata by at least a lag time associated with a table storing the master metadata;
- determining from the master metadata a value of the summary metadata at the time when the live count was started;
- determining a correct value of the summary metadata based at least in part on a value of the live count and the determined value of the summary metadata at the time when the live count was started; and
- responsive to the correct value being different than a current value of the summary metadata, determining that the summary metadata is inaccurate.

19. A computer system for correcting inaccurate summary metadata associated with an entity of a media hosting service, the system comprising:
- a master database configured to store master metadata that describes events involving an entity in a media hosting service;
- a summary database configured to store summary metadata that summarizes the master metadata;
- a probability server computer configured to:
  - calculate a probability of the summary metadata being inaccurate; and
  - determine whether to verify the accuracy of the summary metadata based at least in part on the calculated probability; and
- a verification server computer configured to:
  - determine whether the summary metadata is inaccurate with respect to the master metadata, responsive to determining to verify the accuracy of the summary metadata; and
  - update the summary metadata in the summary database based at least in part on the master metadata, responsive to determining the summary metadata is inaccurate.

20. The system of claim 19, wherein the verification server computer is further configured to:
- determine a correct value of the summary metadata from the master metadata; and
- determine that the summary metadata is inaccurate, responsive to the correct value being different than a current value of the summary metadata.

21. The system of claim 19, wherein the verification server computer is further configured to:
- starting a live count, responsive to determining to verify the accuracy of the summary metadata, the live count updated responsive to detecting at least one event with which the summary metadata is associated;
- delay processing of the master metadata by at least a lag time associated with a table storing the master metadata;
- determine from the master metadata a value of the summary metadata at the time when the live count was started;
- determine a correct value of the summary metadata based at least in part on a value of the live count and the determined value of the summary metadata at the time when the live count was started; and
- determine that the summary metadata is inaccurate, responsive to the correct value being different than a current value of the summary metadata.

22. A method, executed by a computer system, for correcting inaccurate metadata associated with an entity, the method comprising:
- storing first metadata that describes events involving an entity;
- storing second metadata that summarizes the first metadata;
- calculating a probability of the second metadata being inaccurate;
- determining whether to verify the accuracy of second metadata, based at least in part on the calculated probability;
- responsive to determining to verify the accuracy of the second metadata, determining whether the second metadata is inaccurate with respect to first metadata; and
- responsive to determining the second metadata is inaccurate, updating the second metadata based at least in part on the first metadata.

* * * * *

UNITED STATES PATENT AND TRADEMARK OFFICE
CERTIFICATE OF CORRECTION

| | | |
|---|---|---|
| PATENT NO. | : 8,082,235 B1 | Page 1 of 1 |
| APPLICATION NO. | : 12/421445 | |
| DATED | : December 20, 2011 | |
| INVENTOR(S) | : Timothy Dasilva and Nicholas Austin White | |

It is certified that error appears in the above-identified patent and that said Letters Patent is hereby corrected as shown below:

Column 16, line 40, claim 16, after "perform," delete "the".

Signed and Sealed this
Sixth Day of March, 2012

David J. Kappos
*Director of the United States Patent and Trademark Office*